UNITED STATES PATENT OFFICE.

RICHARD B. EASON AND JOHN J. McGIVENY, OF NEW YORK, N. Y.

CEMENT COMPOSITION FOR MOLDING BRICK, &c.

SPECIFICATION forming part of Letters Patent No. 309,612, dated December 23, 1884.

Application filed October 9, 1884. (Specimens.)

*To all whom it may concern:*

Be it known that we, RICHARD B. EASON and JOHN J. McGIVENY, citizens of the United States, residing at the city of New York, in the State of New York, have invented a new and useful cement composition and method of producing the same to be used as a plaster or cement or molded into brick or other forms, of which the following is a specification.

Our composition consists of the following ingredients, combined in the proportions stated, viz: gypsum, fifty parts; ashes, fifty parts. These ingredients, in a dry pulverized state, are thoroughly mingled and placed in water, and boiled with or without agitation, until all of the water is evaporated, and the material thoroughly dried out. When dry, the mass will be a fine powder, which constitutes our new cement, which when used is simply to be wet with water, and used as a plaster or cement, or molded into any desired shape.

Having thus described our invention, what we claim as new, and desire to secure by Letters Patent, is—

1. The herein-described cement composition, consisting of gypsum and ashes in about the proportions specified.

2. The process herein described of treating gypsum and ashes to form cement, consisting in boiling the same in water and continuing the heat until the mass is dry, substantially as described.

RICHARD B. EASON.
JOHN J. McGIVENY.

Witnesses:
  H. A. WEST,
  C. SEDGWICK.